United States Patent
Murthy et al.

(10) Patent No.: US 7,543,852 B2
(45) Date of Patent: Jun. 9, 2009

(54) SEAT BELT ASSEMBLY HAVING LENGTH ADJUSTABLE SERVICE ARM

(75) Inventors: Vasudeva Sankarshana Murthy, Ann Arbor, MI (US); Aaron Robert Latour, Essex (CA); Steven Edward Owen, Amherstburg (CA); Jeffrey Clark, Windsor (CA)

(73) Assignees: Toyota Motor Engineering & Manufacturing North America, Inc., Erlanger, KY (US); Quality Safety Systems, Tecumseh (CA)

( * ) Notice: Subject to any disclaimer, the term of this patent is extended or adjusted under 35 U.S.C. 154(b) by 327 days.

(21) Appl. No.: 11/304,082

(22) Filed: Dec. 15, 2005

(65) Prior Publication Data

US 2007/0138782 A1 Jun. 21, 2007

(51) Int. Cl.
*B60R 21/10* (2006.01)
*B60R 22/20* (2006.01)

(52) U.S. Cl. ............... 280/801.2; 280/808; 248/297.31; 297/468

(58) Field of Classification Search ............. 280/801.2, 280/808, 801.1; 248/297.31; 297/468
See application file for complete search history.

(56) References Cited

U.S. PATENT DOCUMENTS

| | | | | |
|---|---|---|---|---|
| 4,560,204 A | * | 12/1985 | Zeumer et al. | 297/483 |
| 4,610,464 A | * | 9/1986 | Yasumatsu et al. | 280/801.2 |
| 4,786,081 A | * | 11/1988 | Schmidt | 280/801.2 |
| 4,826,210 A | * | 5/1989 | Schmidt | 280/808 |
| 4,938,535 A | | 7/1990 | Condon et al. | |
| 5,050,907 A | * | 9/1991 | Boumarafi et al. | 280/801.2 |
| 5,186,495 A | | 2/1993 | Boumarafi et al. | |
| 5,230,534 A | | 7/1993 | Boumarafi et al. | |
| 6,880,893 B1 | | 4/2005 | Scotton | |
| 2004/0104569 A1 | | 6/2004 | Berger | |

* cited by examiner

*Primary Examiner*—Ruth Ilan
*Assistant Examiner*—Drew J. Brown
(74) *Attorney, Agent, or Firm*—Gifford, Krass, Sprinkle, Anderson & Citkowski, P.C.

(57) ABSTRACT

A seat belt assembly for a vehicle that includes an anchor portion having an anchor bolt adapted to attach to a vehicle. A seat belt web is associated with the anchor portion. A sheath member is coupled to the anchor portion with the sheath member having opposing top and bottom surfaces and opposing side surfaces. The opposing top and bottom surfaces and opposing side surfaces define an interior cavity. The sheath member includes a plurality of detents formed on the opposing side surfaces. An extension plate having opposing proximal and distal ends as well as opposing top and bottom surfaces bounded by opposing lateral edges is slidingly disposed within the interior cavity of the sheath member. The extension plate includes a pair of arms formed on the opposing lateral edges. An extension arm formed about the extension plate includes first and second ends with the first end coupled to the proximal end of the extension plate. The second end of the extension arm includes a web guide formed on an end. The pair of arms releasably engage the plurality of detents for telescopic adjustment of the extension arm whereby the web guide is movable to a plurality of positions.

10 Claims, 3 Drawing Sheets

US 7,543,852 B2

SEAT BELT ASSEMBLY HAVING LENGTH ADJUSTABLE SERVICE ARM

FIELD OF THE INVENTION

The invention relates to seat belt assemblies, and more particularly to seat belt assemblies having a length adjustable service arm.

BACKGROUND OF THE INVENTION

Seat belt assemblies are commonly utilized in automobiles for restraining an occupant within the confines of a seat. Seat belt assemblies generally include a seat belt web associated with a pulley mechanism, such that the web may be passed through a fixed D-ring attached to the vehicle and across the torso of an occupant of a vehicle for latching with a seat belt latch. The fixed D-ring attached to the vehicle provides a fixed point for passing a seat belt across an occupant. Such as design may make the belt difficult to access for the purpose of buckling up.

Various designs have been introduced to improve access to the seat belt. For example, belt guides may be included on the back of a seat. Additionally, non-adjustable service arms have been mounted on the vehicle. Both these designs have limitations that they hinder access to the rear seat and interfere with the comfort of large occupants. Belt integrated seats may solve the problem but at a very high cost.

Therefore, there is a need for an adjustable seat belt assembly that does not hinder access to the rear seat and that does not interfere with the comfort of larger occupants. Such a seat belt assembly should be easy to install on a vehicle and provide access to a rear seat at a cost-effective price. It should also improve seat belt comfort for both larger and smaller occupants of a vehicle.

SUMMARY OF THE INVENTION

A seat belt assembly for a vehicle that includes an anchor portion having an anchor bolt adapted to attach to a vehicle. A seat belt web is associated with the anchor portion. A sheath member is coupled to the anchor portion with the sheath member having opposing top and bottom surfaces and opposing side surfaces. The opposing top and bottom surfaces and opposing side surfaces define an interior cavity. The sheath member includes a plurality of detents formed on the opposing side surfaces. An extension plate having opposing proximal and distal ends, as well as opposing top and bottom surfaces bounded by opposing lateral edges, is slidingly disposed within the interior cavity of the sheath member. The extension plate includes a pair of arms formed on the opposing lateral edges. An extension arm formed with the extension plate includes first and second ends with the first end coupled to the proximal end of the extension plate. The second end of the extension arm includes a web guide formed on an end. The pair of arms releasably engage the plurality of detents for telescopic adjustment of the extension arm such that the web guide is movable to a plurality of positions.

DETAILED DESCRIPTION OF THE PREFERRED EMBODIMENTS

Figure 1:
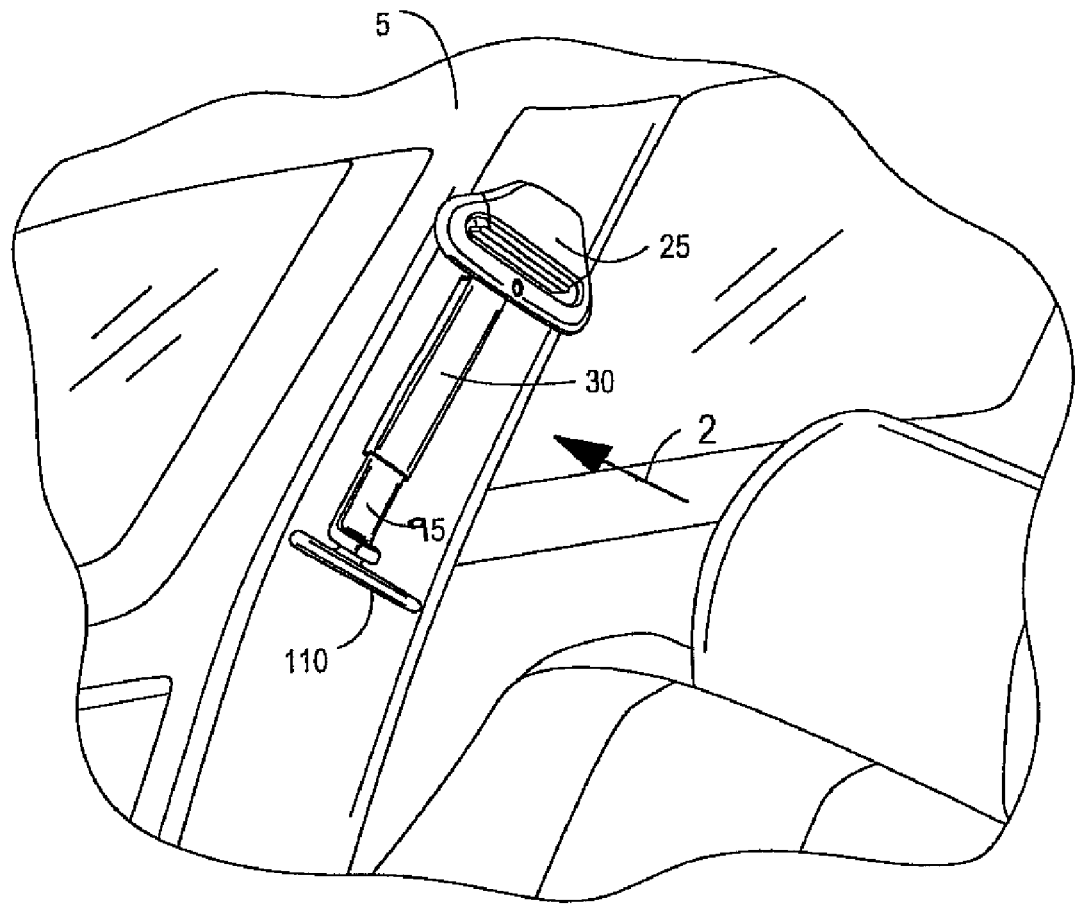
FIG. 1 is a partial perspective view of a seat belt assembly attached to an interior of a vehicle.
Figure 7:
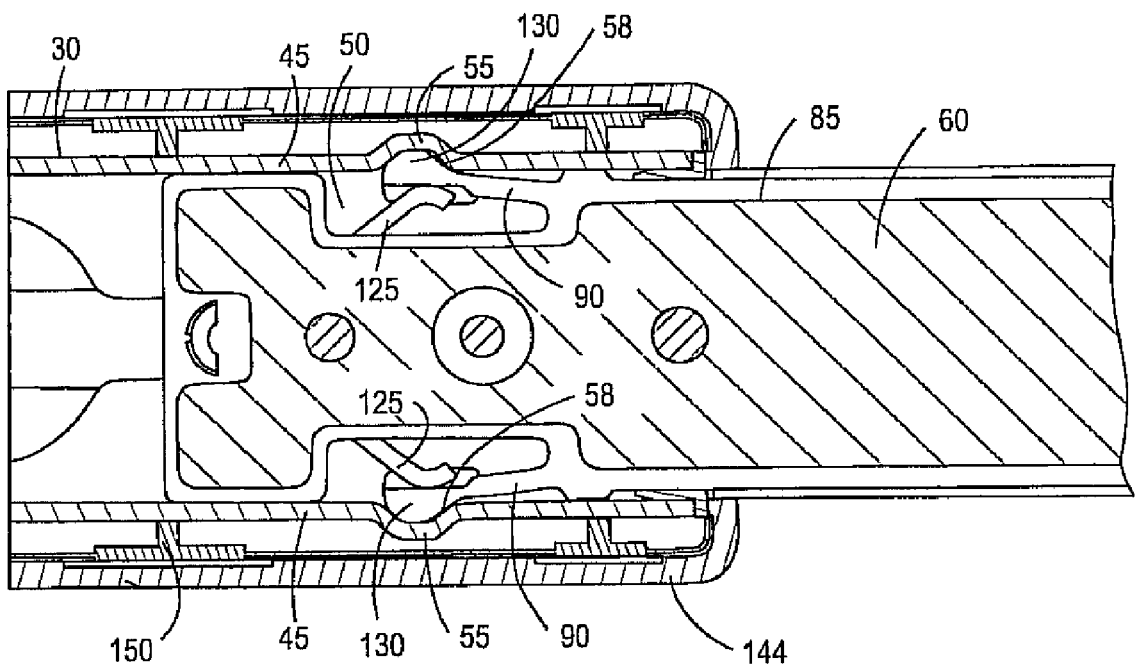
FIG. 7 is a partial top view showing the pair of arms of the extension plate positioned within a recess of the sheath member.
Figure 4:
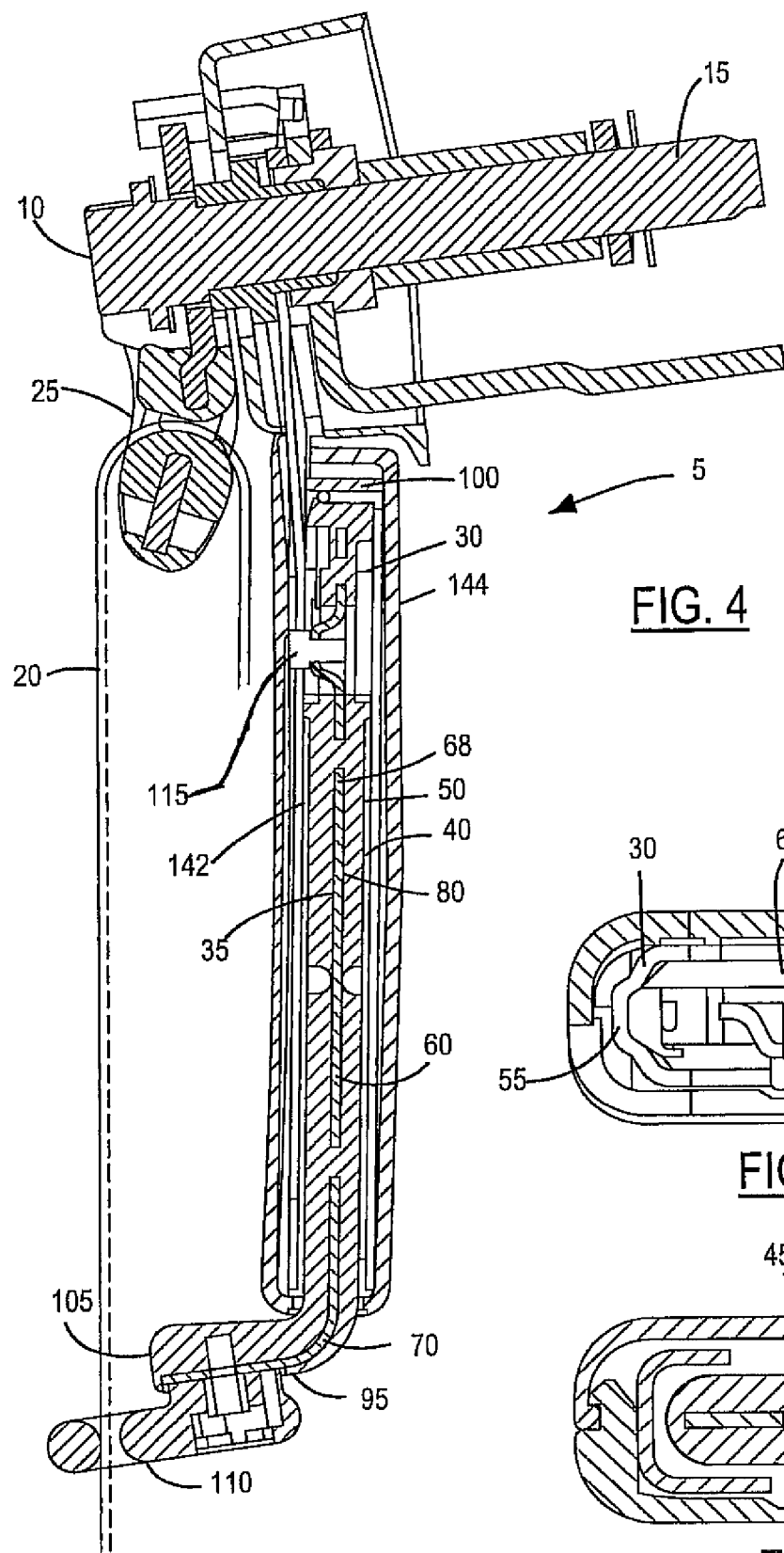
FIG. 4 is a side sectional view of a seat belt assembly cut along the line 4-4 shown in FIG. 2.
Figure 5:
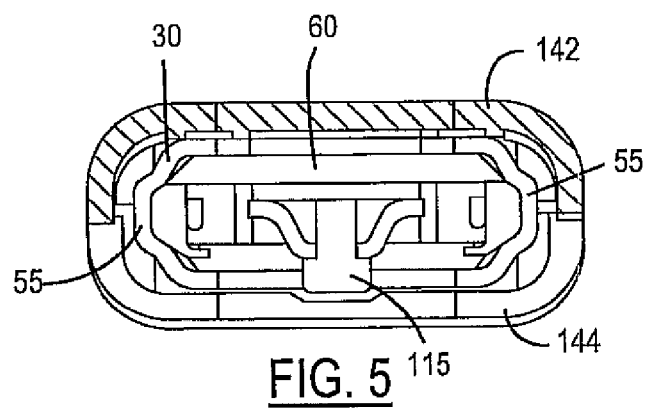
FIG. 5 is a front sectional view cut along the line 5-5 shown in FIG. 2.
Figure 6:
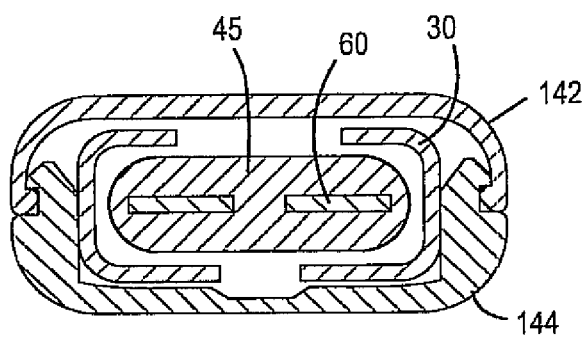
FIG. 6 is a front sectional view cut along the line 6-6 shown in FIG. 2.

Referring to FIGS. 1 and 4, there is shown a seat belt assembly 5 according to the present invention. The seat belt assembly 5 includes an anchor portion 10 having an anchor bolt 15 that is adapted to attach to the vehicle. A seat belt web 20 is associated with the anchor portion 10 and passes over a D-ring 25 that is coupled to the anchor portion 10. A sheath member 30 is connected to the anchor portion 10. The sheath member 30 includes opposing top and bottom surfaces 35, 40, as well as opposing side surfaces 45. The opposing top and bottom surfaces 35, 40 and opposing side surfaces 45 define an interior cavity 50 of the sheath member 30. A plurality of detents 55 are formed on the opposing side surfaces 45, as best shown in FIGS. 5 and 7.

An extension plate 60 including opposing proximal and distal ends 68, 70 has opposing top and bottom surfaces 75, 80 bounded by opposing lateral edges 85. The proximal end 65 of the extension plate 60 is disposed within the interior cavity 50 of the sheath member 30. The extension plate 60 preferably includes a pair of arms 90 that are formed on the opposing lateral edges 85.

An extension arm 95 is formed with the extension plate 60. The extension arm 95 includes first and second ends 100, 105 with the first end 100 coupled to the proximal end 65 of the extension plate 60. The second end 105 has a web guide 110 formed thereon. The web guide 110 is sized and designed to receive the seat belt web 20 of the seat belt assembly 5.

The pair of arms 90 of the extension plate 60 releasably engage the plurality of detents 55 of the sheath member 30 to allow for telescopic adjustment of the extension arm 95 such that the web guide 110 is movable to a plurality of positions.

Figure 2:
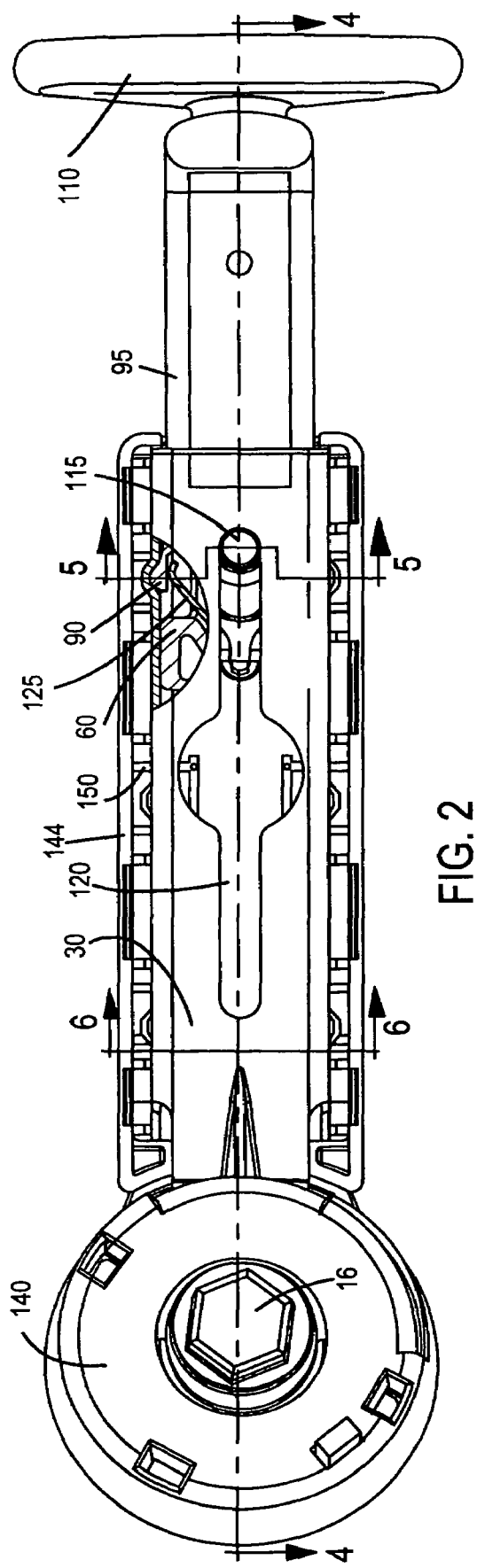
FIG. 2 is a top view of a seat belt assembly according to the present invention.

Referring to FIGS. 2 and 4, the extension plate 60 preferably includes a stop member 115 formed on the top surface 75. The sheath member 30 includes a slot 120 formed through the top surface 35 that receives the stop member 115 of the extension plate 60 to limit the telescopic travel of the extension plate 60 relative to the sheath member 30.

Figure 3:
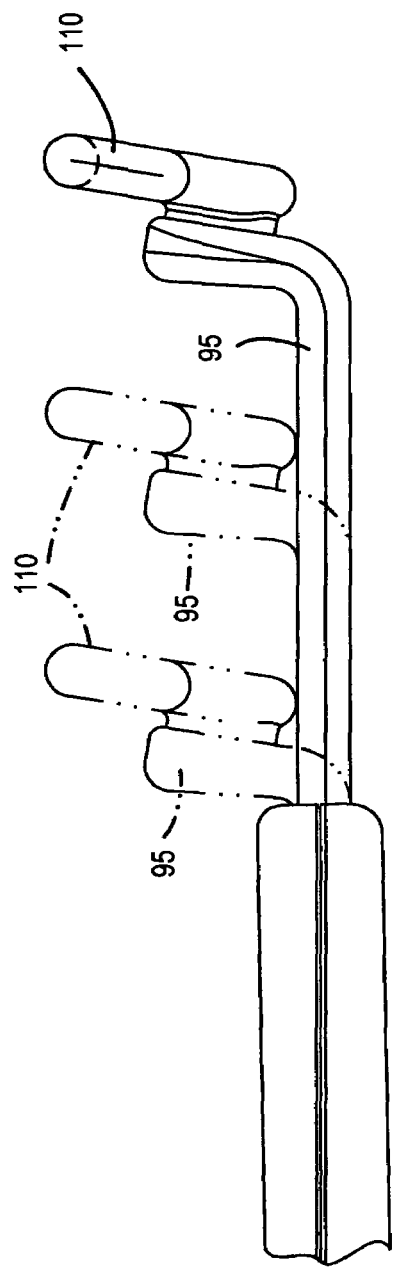
FIG. 3 is a partial front view of the extension arm of the seat belt assembly in three different positions.

As stated above, the extension plate 30 includes a pair of opposing arms 90 for mating with the detents 55 of the sheath member 30 to adjust the extension arm to a number of positions. The extension plate 30 also includes spring members 125 associated therewith for contacting the pair of opposing arms 90 and biasing the opposing arms 90 laterally outward relative to the opposing lateral edges of the extension plate. In this manner, the projections 130 formed on the terminal ends of the opposing arms 90 engage with the detents 55 that include angled walls 58 to hold the extension arm 95 in a specific position until a force is applied to the extension arm 90 exceeding the spring force of the spring members 125. In this manner, telescoping movement of the extension plate and extension arm relative to the sheath member is allowed. In one embodiment shown in FIGS. 2 and 3, the sheath member 30 includes three pairs of opposing detents 55 formed on the opposing side surfaces 45 for engaging the opposing pairs of arms 90 of the extension plate 60 for adjusting the extension arm 95 to three varying positions. It is to be understood that any number of opposing detents 55 may be formed on the opposing side surfaces 95 to allow for any number of positions fixing the extension arm 95 within the sheath member 30.

In one aspect of the invention, the anchor portion 10, as well as the sheath member 30 include cover members 140 disposed about their exterior. In another aspect, the sheath member 30 includes inner and outer cover members 142, 144 that are snapped together to provide an aesthetically pleasing exterior, as well as prevent tampering with the extension plate 60 and sheath member 30. In a preferred aspect, the inner and outer covers 142, 144 include strengthening ribs 150 formed on an inner surface of the covers, as best seen in FIG. 7 to provide for a rigidity of the covers. In a preferred aspect, the extension arm 95 is spaced from the sheath member 30 to allow for unrestricted movement of the extension arm 95 within the sheath member 30.

In use, the seat belt assembly 5 of the present invention is attached to a vehicle such as a B-pillar shown in FIG. 1 with the anchor portion 10 having an anchor bolt 15 securely retained by the B-pillar. The sheath member 30 is coupled to the anchor portion 10 with the extension plate 60 and extension arm 95 received within the cavity 55 defined by the sheath member 30. A seat web guide 110 is formed on the extension arm 95 with a D-ring 25 formed on the anchor portion 10, both of which define a path for a seat belt web 20, as shown in FIG. 4. An occupant of a vehicle may grasp the extension arm 95 and either push or pull the extension arm relative to the sheath member 30 to vary a position of the extension arm 95. As an occupant pulls or pushes on the extension arm 95, the opposing arms 90 formed on the extension plate 60 engage and disengage the detents 55 formed on the sheath member 30. When the extension arm 95 is in a fixed position, the projections 130 of the pair of opposing arms 95 of the extension plate 60 are securely retained within the detents 55 formed in the opposing side surfaces 45 of the sheath member 30. The spring members 125 associated with the pair of opposing arms 95 push laterally outward such that the opposing pair of arms 95 are securely retained in the detents 55.

As an occupant exerts a force exceeding the spring force of the spring members 125, the projections 130 of the pair of opposing arms 95 slide across the slightly angled surface of the detents 55; thereby disengaging with the detent and traveling across the side surface 45 of the sheath member 30 as the extension arm 95 is pulled or pushed relative to the sheath member 30. The projection 130 of the opposing pair of arms 95 travels across the side surface 45 until it reaches an adjacent detent 55 whereby the spring members 125 exert a sufficient force to again push the projection 130 of the pair of arms 95 within the detent 55 formed in the sheath member 30. In this manner, an occupant of a vehicle may adjust the extension arm 95 telescopically relative to the sheath member 30 thereby adjusting a position of where the seat belt web 20 crosses the occupant, as the seat belt web 20 is entrained within the web guide 110 formed on the end of the extension arm 95. Additionally, the seat belt assembly 5 of the present invention is sized and designed such that the extension arm 95 in its fully extended position shown in FIG. 2 does not interfere with an occupant of a vehicle, nor does it prevent egress or ingress into a rear seat of the vehicle.

The invention has been described in an illustrative manner. It is to be understood that the terminology which has been used is intended to be in the nature of words of description rather than limitation. Many modifications and variations of the invention are possible in light of the above teachings. Therefore, within the scope of the appended claims, the invention may be practiced other than as specifically described.

The invention claimed is:

1. A seat belt assembly for a vehicle comprising:
   an anchor portion having an anchor bolt attached to a vehicle preventing movement of the anchor bolt relative to the vehicle;
   a seat belt web associated with the anchor portion;
   a sheath member coupled to the anchor portion, the sheath member having connected opposing top and bottom surfaces and opposing side surfaces defining an interior cavity, the sheath member including a plurality detents formed on the opposing side surfaces;
   an extension plate having opposing proximal and distal ends and opposing top and bottom surfaces bounded by opposing lateral edges, the proximal end slidingly disposed within the interior cavity of the sheath member, the extension plate having a pair of arms formed on the opposing lateral edges;
   an extension arm formed about the extension plate, the extension arm having first and second ends, the first end coupled to the proximal end of the extension plate, the second end having a web guide formed thereon, the extension arm is spaced from the sheath member for allowing unrestricted movement of the extension arm within the sheath member;
   wherein the pair of opposing arms releasably engage the plurality of detents for telescopic adjustment of the extension arm such that the web guide is moveable to a plurality of positions.

2. The seat belt assembly of claim 1 wherein the extension plate includes a stop member formed on the top surface.

3. The seat belt assembly of claim 2 wherein the sheath member includes a slot formed through the top surface of the sheath member receiving the stop member of the extension plate for limiting the telescopic travel of the extension plate relative to the sheath member.

4. The seat belt assembly of claim 1 wherein the extension plate includes spring members associated therewith for contacting the pair of opposing arms and biasing the opposing arms laterally outward relative to the opposing lateral edges of the extension plate.

5. The seat belt assembly of claim 1 wherein the anchor portion includes a D-ring attached thereto for guiding the seat belt web.

6. The seat belt assembly of claim 1 wherein the anchor portion includes a cover disposed about the anchor portion.

7. The seat belt assembly of claim 1 including inner and outer cover members disposed about the sheath member.

8. The seat belt assembly of claim 7 wherein the inner and outer covers include strengthening ribs formed on an inner surface of the covers.

9. The seat belt assembly of claim 1 wherein the sheath member includes three pairs of opposing detents formed on the opposing side surfaces for engaging the opposing pairs of arms of the extension plate and adjusting the extension arm to three varying positions.

10. A seat belt assembly for a vehicle comprising:
    an anchor portion having an anchor bolt adapted to attach to a vehicle;
    a seat belt web associated with the anchor portion;
    a sheath member coupled to the anchor portion, the sheath member having connected opposing top and bottom surfaces and opposing side surfaces defining an interior cavity, the sheath member including a plurality detents formed on the opposing side surfaces;

an extension plate having opposing proximal and distal ends and opposing top and bottom surfaces bounded by opposing lateral edges, the proximal end slidingly disposed within the interior cavity of the sheath member, the extension plate having a pair of arms formed on the opposing lateral edges and spring members associated with the pair of arms for contacting the pair of opposing arms and biasing the opposing arms laterally outward relative to the opposing lateral edges of the extension plate;

an extension arm formed about the extension plate, the extension arm having first and second ends, the first end coupled to the proximal end of the extension plate, the second end having a web guide formed thereon;

wherein the pair of arms releasably engage the plurality of detents for telescopic adjustment of the extension arm such that the web guide is moveable to a plurality of positions.

\* \* \* \* \*

UNITED STATES PATENT AND TRADEMARK OFFICE
CERTIFICATE OF CORRECTION

PATENT NO. : 7,543,852 B2  Page 1 of 1
APPLICATION NO. : 11/304082
DATED : June 9, 2009
INVENTOR(S) : Vasudeva Sankarshana Murthy et al.

It is certified that error appears in the above-identified patent and that said Letters Patent is hereby corrected as shown below:

Column 4, line 6 after "attached" insert --immovably--
Column 4, line 13 before "detents" insert --of--
Column 4, line 19 after "of" insert --opposing--
Column 4, line 66 before "detents" insert --of--
Column 5, line 5 after "of" insert --opposing--
Column 5, line 7 before "arms" insert --opposing--
Column 6, line 5 before "arms" insert --opposing--

Signed and Sealed this

Thirteenth Day of October, 2009

David J. Kappos
*Director of the United States Patent and Trademark Office*